March 19, 1963
I. JEPSON ETAL
3,082,313
COOKING VESSEL
Filed Aug. 25, 1958
4 Sheets-Sheet 2
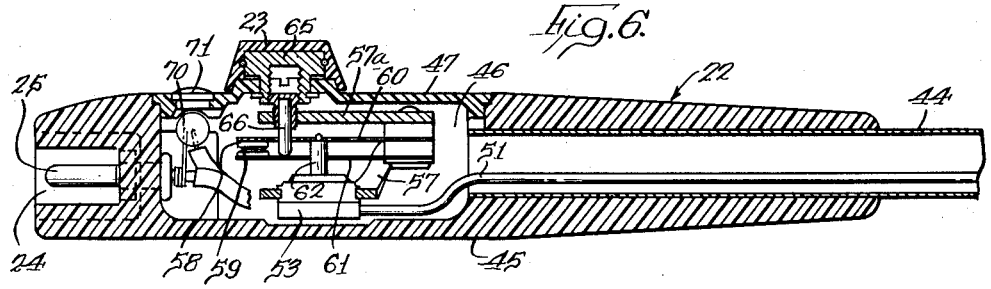
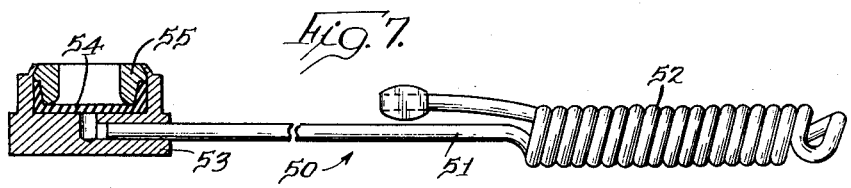
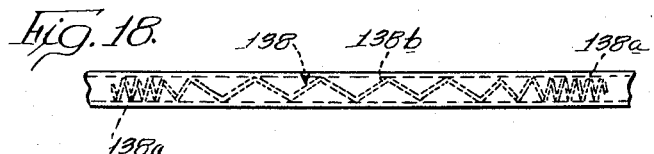
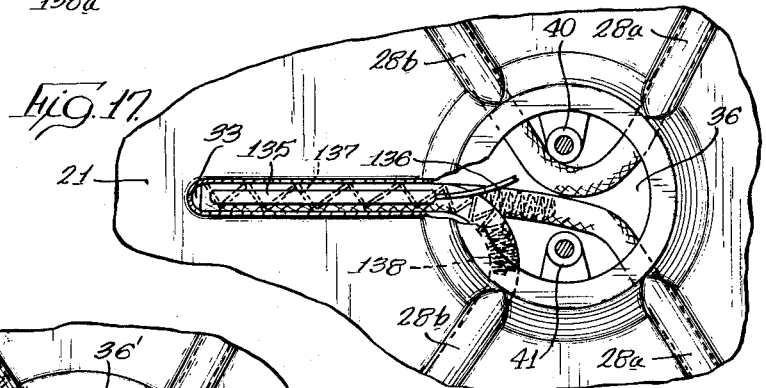
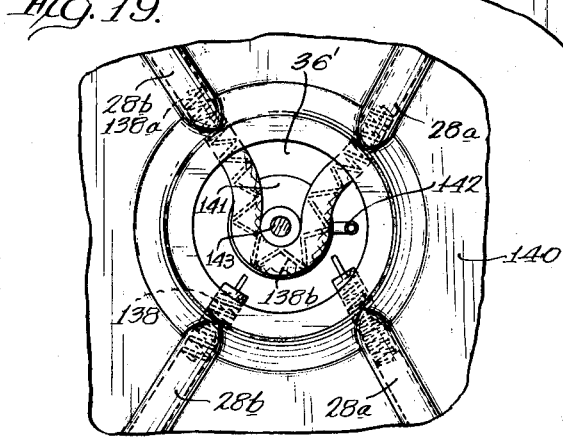
INVENTORS.
Ivar Jepson
Fred Ottosen
By George R. Clark
Atty.

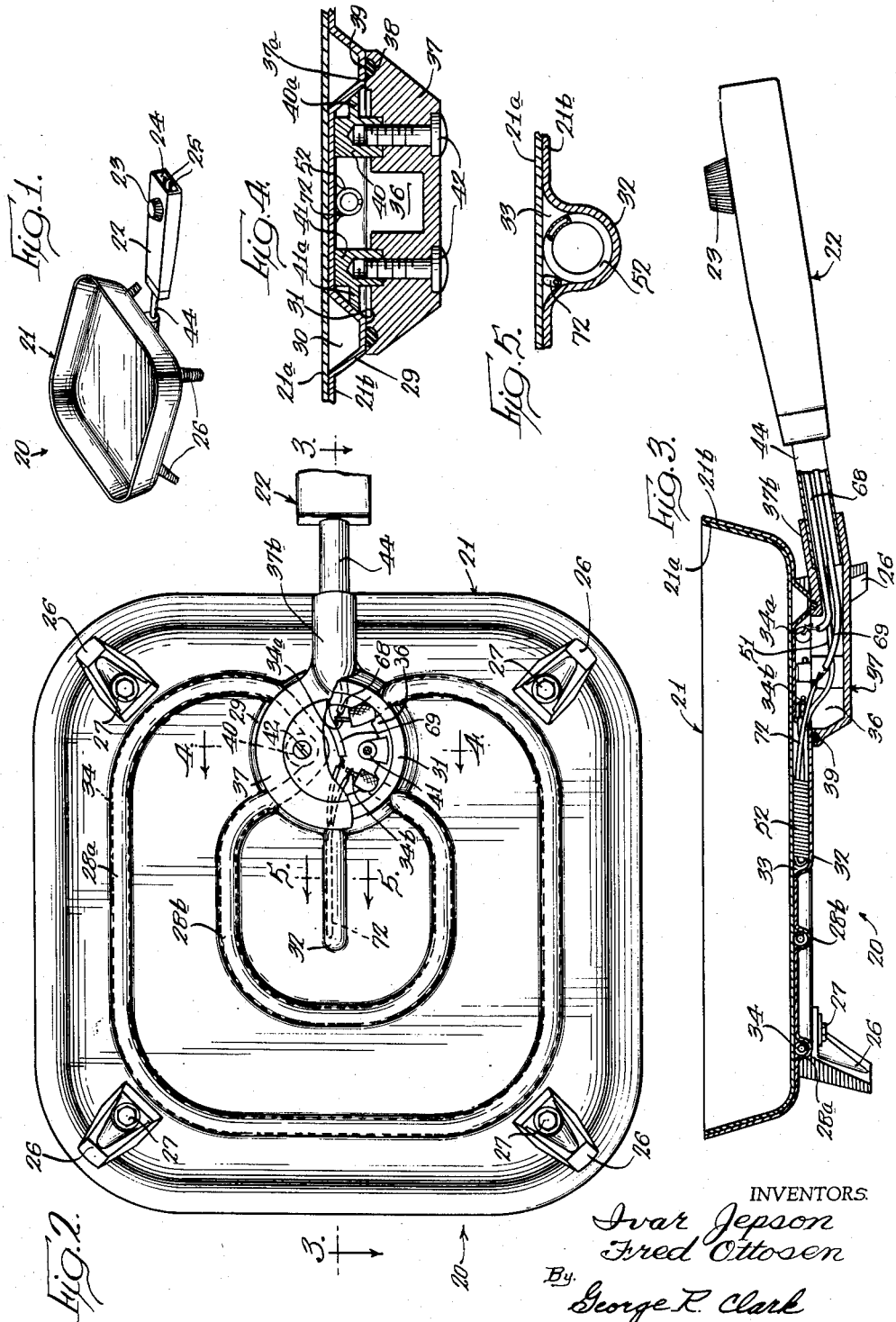

March 19, 1963    I. JEPSON ETAL    3,082,313
COOKING VESSEL
Filed Aug. 25, 1958    4 Sheets-Sheet 3
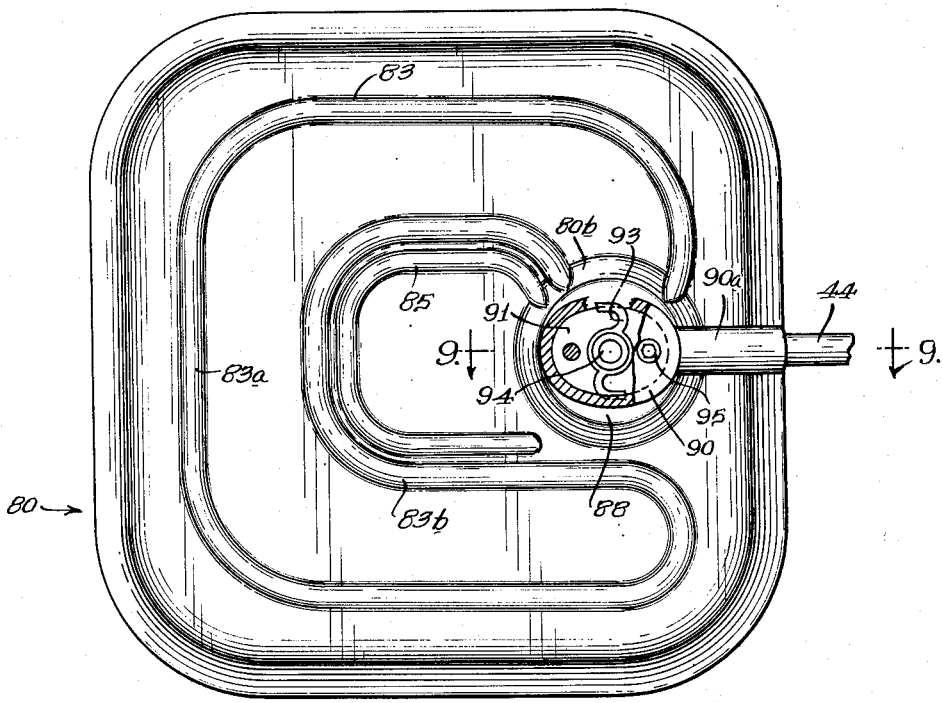
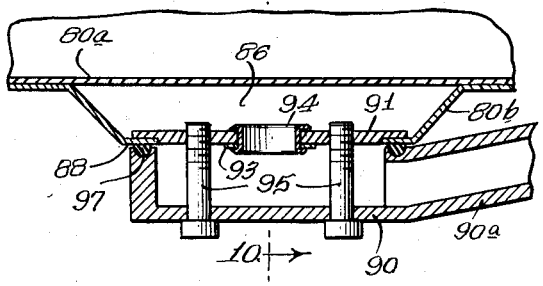
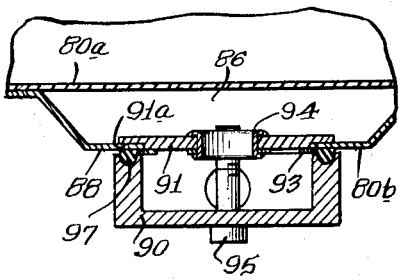
INVENTORS.
Ivar Jepson
Fred Ottosen
By George R. Clark
Atty.

March 19, 1963 I. JEPSON ETAL 3,082,313
COOKING VESSEL
Filed Aug. 25, 1958 4 Sheets-Sheet 4
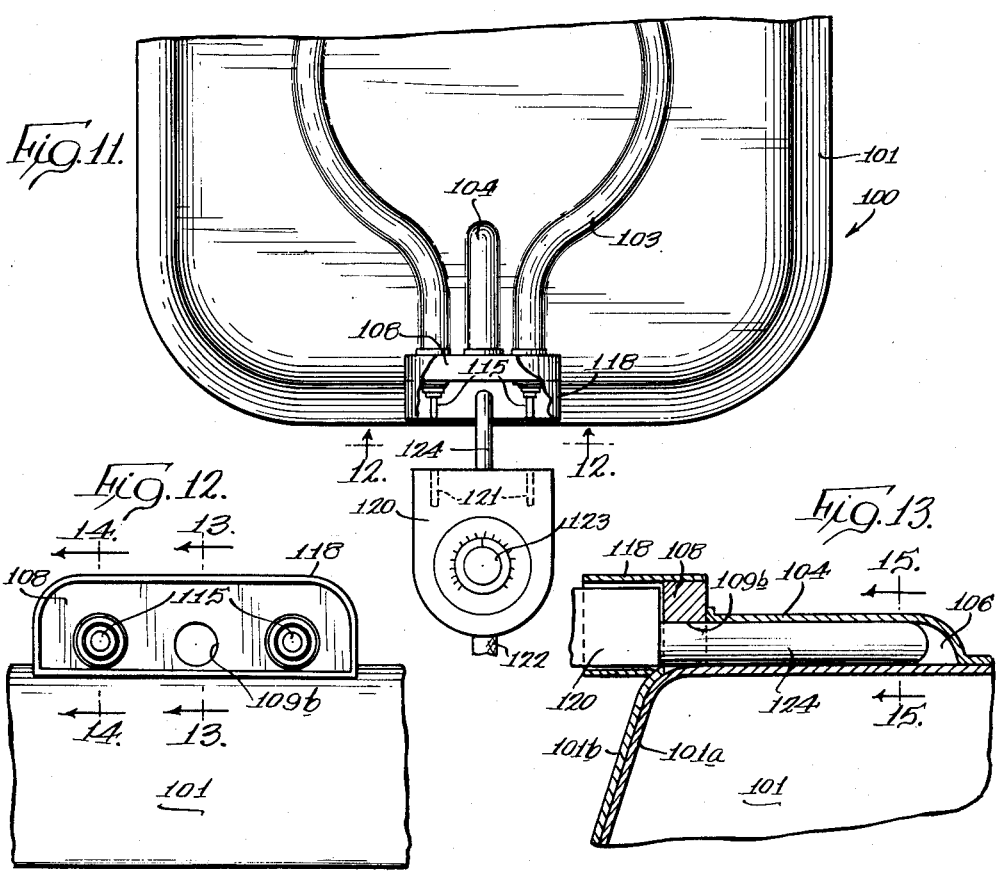
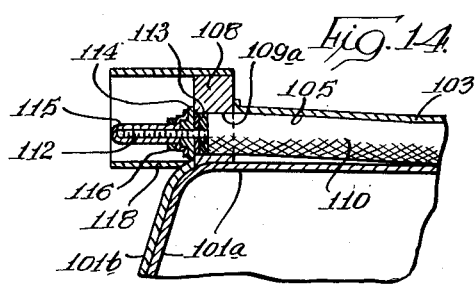
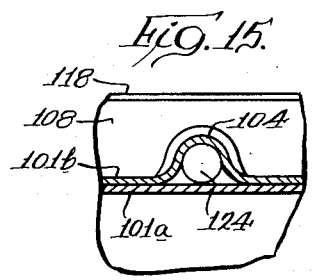
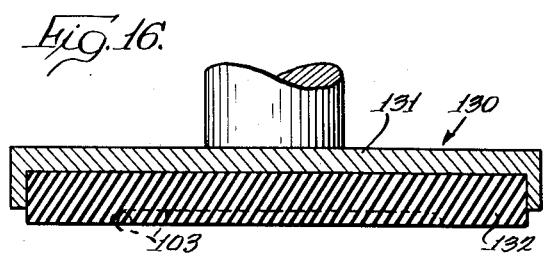
INVENTORS
Ivar Jepson
Fred Ottosen
By George R. Clark
Atty.

United States Patent Office 3,082,313
Patented Mar. 19, 1963

3,082,313
COOKING VESSEL
Ivar Jepson, Oak Park, and Fred Ottosen, Chicago, Ill., assignors to Sunbeam Corporation, Chicago, Ill., a corporation of Illinois
Filed Aug. 25, 1958, Ser. No. 756,904
18 Claims. (Cl. 219—44)

The present invention relates to electric heating devices, and specifically to electric cooking vessels. More particularly, the present invention is an improvement on the invention disclosed and claimed in copending Jepson application, Serial No. 622,949, filed November 19, 1956, assigned to the same assignee as the present invention, and now Patent No. 3,031,735, granted May 1, 1962.

Self-contained electrically heated cooking vessels have been extensively sold ever since the development of the cooking vessel disclosed and claimed in Jepson Patent No. 2,744,995, granted May 8, 1956. A cooking vessel substantially like that disclosed in the aforementioned Jepson patent was introduced to the trade in 1953, and was immediately successful. One of the principal reasons for the success of cooking vessels of the type shown in Jepson Patent No. 2,744,995 is the immersibility of the same in water or other liquid for cleaning purposes, all the electric controls being completely sealed. The problem of manufacturing such cooking vessels so that they can be immersed for cleaning purposes has not been a simple one to solve, and manufacturers have made the vessels in various ways. They have been manufactured as castings of light metal such as aluminum, and the vessels have also been drawn from sheet metal with the necessary welding and soldering of joints to insure immersibility. In the above-mentioned copending Jepson application, Serial No. 622,949, there is disclosed a cooking vessel in which two layers of material such as aluminum are bonded together over the entire adjacent surfaces except for a limited area arranged in a particular pattern, which unbonded pattern is then expanded to provide a sort of tubular passageway between the layers to accommodate a heating element. This arrangement provides a very desirable cooking vessel, since the two layers are intimately bonded together and, being made from sheet material, comprise a vessel without perforations or other imperfections which one might find in a casting.

In such controlled cooking vessels a temperature sensing element is, of necessity, employed, and where the temperature control means is embodied in a handle and a portion of the vessel it is usually desirable to have some sort of housing adjacent the cooking surface for enclosing and protecting such temperature sensing element. It would be desirable to provide improved means for producing such a housing in a cooking vessel in which the passageway for the heating element is obtained by expanding the metal. Additionally, the problem of securing the handle to the vessel is always present, and it would be desirable to provide an improved arrangement for accomplishing this. In any electric heating device, and particularly in cooking vessels where it is desired to maintain a constant temperature, it is important that such temperature be maintained throughout the entire cooking surface. In cooking vessels produced heretofore, the heating element has been distributed over the surface of the bottom of the vessel in a sort of loop arrangement. Where a relatively large cooking surface is involved, it is possible for a substantial temperature differential to occur over the cooking surface area, and in cooking devices which have been placed on the market temperature differentials of the order of 100° F. have been measured at various points on the cooking surface. This, of course, is very undesirable. If a control is set to perform a cooking operation at a certain selected temperature, then this selected temperature should be substantially maintained throughout the entire cooking area. It would be desirable, therefore, to provide an improved cooking vessel wherein a temperature deviation of the order of only 10° F. or less from the predetermined selected temperature can occur throughout the cooking area.

In heating devices or cooking vessels which are manufactured in accordance with the teachings of the above-mentioned application Serial No. 622,949, there is always a problem of deforming the vessel after the heating element has been inserted, not only to hold the heating element in proper position, but also to hold it in good heat transfer relationship with the vessel. It would be desirable to provide improved means for accomplishing such deforming operation.

Accordingly, it is an object of the present invention to provide an improved electrical heating device.

It is another object of the present invention to provide an improved electric cooking vessel of the type in which a heating element is disposed in a passageway defined between two layers of metal, and the cooking vessel is completely sealed against the entrance of moisture and the like.

It is another object of the present invention to provide an improved cooking vessel in which accurate temperature control of the entire cooking surface is obtained.

Still another object of the present invention is to provide an improved cooking vessel with novel means for securing thereto the necessary handle means.

It is a further object of the present invention to provide a cooking vessel with improved control means for maintaining a uniform temperature of the cooking surface at any predetermined setting.

Further objects and advantages of the present invention will become apparent as the following description proceeds, and the features of novelty which characterize the invention will be pointed out with particularity in the claims annexed to and forming a part of this specification.

For a better understanding of the present invention, reference may be had to the accompanying drawings in which:

FIG. 1 is a perspective view illustrating a cooking vessel embodying the present invention;

FIG. 2 is a greatly enlarged bottom view of the vessel portion of the cooking vessel of FIG. 1, with certain portions thereof cut away more accurately to illustrate the invention;

FIG. 3 is a sectional view taken on line 3—3 of FIG. 2, assuming that FIG. 2 shows the complete structure;

FIG. 4 is an enlarged sectional view taken on line 4—4 of FIG. 2, again assuming that FIG. 2 shows the complete structure;

FIG. 5 is an enlarged sectional view taken on line 5—5 of FIG. 2;

FIG. 6 is an enlarged longitudinal sectional view taken through the handle of the cooking vessel of FIGS. 1 and 3;

FIG. 7 is an enlarged view, partly in section, of the temperature responsive control device employed in the cooking vessel of FIG. 1;

FIG. 8 is a view somewhat similar to FIG. 2, with certain portions thereof cut away including the legs and leg supporting means, illustrating a modification of the present invention;

FIG. 9 is an enlarged sectional view taken on line 9—9 of FIG. 8, assuming that FIG. 8 shows the complete structure;

FIG. 10 is a sectional view taken on line 10—10 of FIG. 9, assuming that FIG. 9 shows the complete structure;

FIG. 11 is a fragmentary exploded bottom view of a cooking vessel and control means therefor illustrating still another embodiment of the present invention;

FIG. 12 is an enlarged view looking in the direction of the arrows 12—12 in FIG. 11;

FIG. 13 is a sectional view taken on line 13—13 of FIG. 12 with the temperature control device in control position;

FIG. 14 is a sectional view taken on line 14—14 of FIG. 12;

FIG. 15 is a sectional view taken on line 15—15 of FIG. 13, assuming that FIG. 13 shows the complete structure;

FIG. 16 is a fragmentary sectional view of a device used in the manufacture of the cooking vessel of the present invention;

FIG. 17 is a fragmentary bottom view of a cooking vessel illustrating still another modification of the present invention;

FIG. 18 is an enlarged fragmentary developed view of the heating element of FIG. 17; and FIG. 19 is a bottom view similar to FIG. 17 illustrating still another modification of the present invention.

Preferably, the present invention is concerned with certain features of a cooking vessel, which cooking vessel is manufactured from two sheets of metal, one defining the interior of the cooking vessel and the other the exterior, and which sheets are bonded together throughout the entire area thereof except for certain limited portions which are to define internal passageways for an electric heating element and the like. The portions of the two sheets which are not bonded together are expanded by any suitable means to define a tubular cavity or passageway into which a heating element is inserted, and the walls defining this passageway are subsequently deformed so as to be in intimate heat exchange relationship with the heating element. Improved arrangements of the heating element itself, the control means thereof, the housing means for the various elements, and the means for supporting the vessel from a suitable handle are detailed features of the present invention.

It will be understood that the present invention is applicable to heating units or cooking vessels of all kinds wherever it is desirable to use an electric heating element and control means for either maintaining a constant temperature or providing a certain desired temperature control. For the purpose of illustrating the present invention, it has been shown as applied specifically to a cooking vessel which is commonly referred to as an electric frying pan. It should be understood that this is by way of example only, and the particular vessel may vary widely from that shown. The temperature sensing element may also be varied, but is preferably of the type disclosed in a copending Jepson and Hill application, Serial No. 501,652, filed April 15, 1955, and also assigned to the same assignee as the present application.

Referring now to FIGS. 1 to 7 of the drawings, there is illustrated an electrically heated cooking vessel of the type having accurate self-contained temperature control means, which cooking vessel is generally designated by the reference numeral 20. This cooking vessel 20 is specifically illustrated as a frying pan comprising a container or vessel portion 21 which is illustrated as of substantially rectangular configuration, thereby permitting one to cook more food in the same area as contrasted with the circular frying pan heretofore commonly employed. To make cleaning a simple problem, the four corners of the vessel are smoothly rounded. Associated with the container or vessel portion 21 of the cooking vessel 20 is a suitable handle, generally designated by the reference numeral 22, which contains certain control portions including a control knob 23 which is manually adjustable to select the desired cooking temperature. As illustrated, the end of the handle 22 remote from the vessel portion or container 21 is provided with a cord receptacle recess 24 into which extend pin type electrical terminals 25 (FIGS. 1 and 6) for engagement with a suitable power cord in a manner well understood by those skilled in the art.

The cooking vessel 20 will preferably also be provided with suitable legs, generally designated at 26, which may have various forms and construction. Preferably and as illustrated, they are identical with the legs disclosed in a copending Jepson and Wickenberg application, Serial No. 739,876, filed June 4, 1958, and assigned to the same assignee as the instant application. They may, of course, be identical with the legs disclosed and claimed in the above-mentioned Jepson Patent No. 2,744,995. As illustrated, these legs are secured by fastening means 27 to suitable tapped studs which in turn are welded or otherwise fastened to the underside of vessel portion 21.

As is fully disclosed in the above-mentioned copending Jepson application, Serial No. 622,949, the container or vessel portion 21 is formed of two sheets of metal, preferably aluminum, comprising an inner sheet 21a and an outer sheet 21b (FIG. 3) metallurgically bonded together over substantially the entire area of contact, so that, to all intents and purposes, only a single sheet is involved, there being homogeneity across the interface. Actually, the disclosure in FIG. 3 is not an accurate representation of the completed article, since it indicates two separate sheets instead of the homogeneous piece of material which results. However, the particular crosshatching employed is for the purpose of more clearly illustrating the cooking vessel of the present invention.

The particular method of manufacturing the container or vessel portion 21 forms no part of the present invention insofar as metallurgically bonding the two layers 21a and 21b together and providing the necessary passageways for the heating element, but is fully disclosed and claimed in the abovementioned copending application Serial No. 622,949.

Preferably, the sheets 21a and 21b, which may be formed of the same or different materials, are arranged so that they may be bonded together in a suitable furnace or the like. Before the bonding operation, one of the sheets, after suitable cleaning, has provided thereon a weld preventing material arranged in a pattern conforming with that where metallurgical bonding between the two materials is not desired. The two sheets 21a and 21b are then superimposed with the pattern of weld preventing material between selected portions thereof, and the superimposed sheets are placed in a suitable furnace which insures metallurgical bonding over the entire interface except for the pattern of weld preventing material. Such bonding may involve hot rolling and other bonding steps, followed by cold rolling to the finished gauge, and annealing to remove any hardening effect of the cold rolling. After this the unwelded portions of the two sheets are expanded by hydraulic or other means while the metal is in a suitable die so that the expansion occurs on only one side thereof and so that a plane cooking surface is defined on the other side. The passageways then provided are cleaned so as to remove any of the weld preventing material.

In the drawings, and specifically in FIGS. 2 and 3 thereof, the vessel portion 21 is disclosed with the expanded passageway defined by two ribs, each in the form of a loop, designated as 28a and 28b, respectively. These ribs, which really define tubular passageways between the two layers 21a and 21b, are concentrically arranged, and the ends of the ribs terminate in a raised circular rib generally designated as 29, which circular rib defines an annular passageway 30, best shown in FIG. 4 of the drawings. This annular passageway 30 is also defined between the layers 21a and 21b, and is not for the purpose of receiving therein a heating element but, instead, is provided to define a raised flat annular sealing surface 31 (FIGS. 2 and 4), the purpose of which will become apparent from the ensuing description. In addition to the passageways defined by the ribs 28a, 28b and 29, there is provided a short rib 32 which defines a stub passageway 33 connected to the circular area defined within the confines of the circular rib 29. Except for the passageways defined by the ribs 28a, 28b, 29 and 33, the adjacent faces of the sheets 21a and 21b are metallurgically bonded together throughout the entire area thereof so as, in effect, to comprise a single homogeneous sheet.

For the purpose of heating the cooking surface of the vessel portion or container 21, there is provided a suitable heating element, generally designated at 34, which is inserted into the passageways defined by the ribs 28a and 28b. Preferably, this heating element may be similar to that disclosed in the above-mentioned application Serial No. 622,949, and a single length of this heating element is preferably threaded through the passageways of both loops defined by the ribs 28a and 28b so that the terminals 34a and 34b of such heating element are disposed within the circular area defined by the circular rib 29. It will be appreciated that suitable access openings to the passageways defined by the ribs 28a, 28b and 32 connecting these passageways to the circular area defined by the circular rib 29 must be provided as by cutting through the sheet 21b in a manner well understood by those skilled in the art.

The composite sheet defined by the two sheets 21a and 21b, with the passageways defined therein and the heating element 34 in position, is now ready for drawing into the shape of the desired cooking vessel which is shown in the drawings. Whether the drawing operation occurs before or after the heating element 34 is in place is unimportant as far as the present invention is concerned, but a swaging operation with respect to the ribs 28a and 28b is necessary, and preferably the drawing and swaging operation can be accomplished in one simple operation. In any event, upon the completion of this operation, the ribs 28a and 28b defining the passageways for the heating element 34 tightly embrace the heating element 34 so that the latter is in good heat conducting relationship with the vessel portion 21 of the cooking vessel 20.

From the above description it will be apparent that there has been provided within the circular area surrounded by the annular passageway 30 a control chamber 36 into which the terminals 34a and 34b of the heating element extend, and which control chamber 36 is connected to the stub passageway 33. In accordance with the present invention there is provided a cover 37 for closing the open control chamber 36, which cover also provides a means for securing the handle 22 to the vessel portion or container 21. As illustrated, the cover 37 comprises a suitable casting having an annular surface 37a which corresponds to the annular sealing surface 31. Moreover, the annular surface 37a is provided with a suitable recess 38 for accommodating a suitable sealing gasket 39, preferably formed of a silicone material or the like. The closure 37 further includes a suitable tubular extension 37b, best shown in FIGS. 2 and 3, whereby the chamber 36 may be connected with a suitable chamber defined in a hollow handle.

With the arrangement disclosed in FIGS. 1 to 7 of the drawings, in order to secure the closure member 37 to the vessel portion 21, there preferably are provided a pair of tapped studs 40 and 41 which are suitably brazed or otherwise secured to the bottom of the vessel within the chamber 36 as clearly indicated in FIG. 4 of the drawings. If desired, these studs 40 and 41 are provided with suitable lateral projections 40a and 41a, respectively, to provide increased rigidity, which projections are also brazed or otherwise secured to the portion of the vessel defining the annular passageway 30. A pair of screws 42 extending through suitable openings in the closure 37 firmly secure the closure 37 to the vessel portion 21 in sealing engagement with the annular surface 31 thereby providing a completely sealed control chamber 36, which control chamber houses the electrical connections to the heating element and to the temperature sensing element described hereinafter. If desired, suitable gaskets may be employed with the fastening means 42 in the manner disclosed in the above-mentioned Jepson Patent No. 2,744,995 to insure that this main opening to chamber 36 is completely sealed against the entrance of moisture or the like.

For the purpose of securing the handle 22 to the vessel portion 21 in a manner to insure that the handle 22 remains cool and can be grasped at any time by the operator, there is provided a tubular support 44 preferably formed of stainless steel or similar material which is a poor conductor of heat and at the same time has a pleasing, non-corrodible finish. This tubular member 44 is preferably molded into the handle 22 in the manner disclosed and claimed in the above-mentioned Jepson Patent No. 2,744,995, with a portion thereof extending beyond the end of the handle 22. To insure firm and integral relationship between the tube 44 and the handle 22, the former is preferably provided with a knurled section (not shown), thus insuring firm bonding between the two during the molding operation.

To secure the handle 22 and the tubular member 44 to the vessel portion 21, the tubular portion 44 is inserted into the tubular extension 37b with a press fit of sufficient length to insure a moisture-tight seal at that point. Although the tube 44 has been indicated as of circular cross section, it may, if desired, have a noncircular configuration so as inherently to resist relative rotation between the extension 37b and the tubular member 44. It will be appreciated that stainless steel has a different coefficient of expansion from that of aluminum and, assuming the closure member 37 to be made of aluminum, the tube 44 is forced into the opening in the extension 37b with a sufficient press fit to compress the tube 44. The extension 37b is of sufficient wall thickness as not to be expanded by such a press fit. Thus the tube 44 is under considerable compressive stress but within the elastic limit of the stainless teel tube 44. Although aluminum expand lightly more than stainless steel upon heating, the resilience of the tube 44, by virtue of the aforementioned compressive stress, maintains a tight fit under all conditions encountered in use to assure the desired moisture-tight seal.

Any suitable temperature control means for controlling the temperature of the cooking vessel of the present invention may be employed. Preferably, the control arrangement of cooking vessel of the present invention is similar to that disclosed and claimed in a copending Jepson and Hill application, Serial No. 501,652, filed April 15, 1955, and assigned to the same assignee as the instant application.

Referring now to FIGS. 3, 5, 6 and 7 of the drawings, the handle 22 is shown in detail as comprising a hollow insulating member 45 formed of a suitable phenolic resin closed at one end but provided at said closed end with the recess 24 for the plug receptacle, into which recess the terminals 25 extend. As illustrated, this handle 22 is provided near its closed end with a suitable chamber 46 which opens to one side of the handle and is closed by a suitable closure plate 47 which may be secured in position in any suitable manner.

In order to maintain any selected temperature of the cooking surface of the cooking vessel 20, it is necessary to employ a temperature responsive device of some sort. This device might be like that disclosed in the above-mentioned Jepson Patent No. 2,744,995, but preferably is disclosed as similar to the control in the above-mentioned Jepson and Hill application, Serial No. 501,652. So that there will be no moving elements such as switch contacts or bimetallic elements anywhere near the vessel 21 or the control chamber 36 associated therewith, there is employed a temperature responsive device of the type relying upon the expansion of a fluid with temperature. The expansible fluid type device is shown in detail in FIG. 7 and is generally designated by the reference numeral 50. This device comprises a capillary tube 51 which is indicated as arranged in a spiral coil 52 at one end thereof, while the other end is connected to a suitable head 53 somewhat in the form of a cup-shaped member in which is suitably supported a flexible diaphragm 54 secured to the head 53 in any suitable manner as by the diaphragm retainer 55. Preferably, the spiral coil 52 is a closely wound spiral having an external diameter closely conforming to the internal diameter of the passageway 33. It will be apparent that the expansion of fluid within the tube 51, as by virtue of heating the coiled end 52 thereof, will cause mechanical movement of the diaphragm 54, which can be used to perform a suitable control function as described hereinafter. To this end the temperature responsive device 50 is inserted with the head portion 53 disposed in the handle chamber 46, while the coiled portion 52 is disposed within the passageway 33, thus necessitating that the tube 51 interconnecting these elements be located not only in the two separate chamber 33 and 46, but that it extend within the tube 44 interconnecting the two chambers.

As best shown in FIG. 6 of the drawings, the diaphragm head 53 is supported on a suitable frame 57 disposed within the chamber 46 in the handle 22, which frame also supports a pair of relatively movable contacts 58 and 59 defining a control switch, the contact 58 being supported on a spring arm 60, while the contact 59 is supported on a spring arm 61. These spring arms 60 and 61 are mounted in spaced parallel and insulated relationship from the frame 57, and the whole assembly is suitably mounted within the chamber 46. The spring arm 60 supporting the contact 58 is connected by means of a suitable diaphragm rod 62, preferably formed of porcelain or the like, with the diaphragm 54. Upon expansion of the expansible fluid within the tube 51, the diaphragm 54 will be deflected upwardly as viewed in FIGS. 6 and 7 of the drawings, with the resultant upward movement of the rod 62 and consequent upward movement of the contact 58, which might be referred to as the movable contact of the switch defined by contacts 58 and 59. The other contact 59 is selectively adjustable by means of the manual control knob 23 which is suitably secured to an adjustment shaft 65 which, through various connections, controls an insulating rod 66, which is vertically movable upon rotation of knob 23 thereby to adjust the position of contact 59. The frame 57 is preferably provided with a tapped opening in a portion 57a thereof for receiving the supporting means for the vertically movable insulating rod 66 to permit ready adjustment of the control knob 64.

It will be appreciated that one of the terminals 25 will be electrically connected as by a conductor 68 (FIG. 2) with one terminal such as 34a of the heating element 34. The other of the terminals 25 is connected by a conductor 69 which is connected to the terminal 34b of the heating element 34 through the contacts 58 and 59 of the control switch and through an auxiliary heater described hereinafter. Preferably a suitable indicating light 70 is connected across the switch contacts so as to indicate when power is supplied to the heating element 34. This indicating light 70 is illustrated as being supported within the handle chamber 46 adjacent an opening in the cover 47 which may be closed by a suitable lens 71.

In accordance with the present invention there is provided an electric resistance or heater element generally designated at 72 (FIGS. 2 and 5), which heater is disposed within the stub chamber 33 in intimate heat exchange relationship with the coiled tube 52 defining the temperature sensitive element. This heater 72 is preferably connected in series with the main heating element 34 in series with the contacts 58 and 59 of the control switch as mentioned above and provides a sort of anticipatory heater for supplying additional heat to the temperature sensitive portion 52. It will be appreciated that the temperature sensitive portion 52 receives heat from the bottom of the cooking vessel portion 21 and also from the heater 72. The heater 72 thus causes the electrical heating circuit to be interrupted at contacts 58 and 59 slightly sooner than would be the case if the heater 72 were omitted, and is especially desirable to prevent initial overshoot when the heating element 34 of the vessel is initially connected to a source of electrical energy.

In view of the detailed description included above, the operation of the cooking vessel of the present invention will readily be understood by those skilled in the art. The veessel chamber 36 is defined in a very simple manner and is connected to the passageways defined by the ribs 28a, 28b and 32. Thus a completely sealed construction is provided when the closure member 37 and the handle 22 are in place and the vessel is readily immersible for cleaning purposes. In addition, it has been found that very accurate temperature control is obtained. As a matter of fact, vessels built in accordance with the disclosure of the invention described thus far show a temperature deviation of no more than 10° F. across the entire cooking surface, which is far superior to most cooking vessels available on the market today.

In the arrangement described heretofore the closure member 37 is secured in sealing relationship with the means defining the chamber 36 by brazing suitable tapped studs 40 and 41 to the vessel bottom. In FIGS. 8, 9 and 10 there is disclosed an arrangement where the requirement of the studs welded to the bottom of the vessel is eliminated and, instead, a suitable vessel support and closure member is clamped to the relatively thin walls defining the vessel.

Referring now to FIGS. 8, 9 and 10 of the drawings, there is illustrated a cooking vessel generally indicated at 80, which may have the identical leg and handle arrangement heretofore described, including the tubular portion 44. For simplifying the disclosure, the legs and leg supports have been omitted from FIG. 8. Preferably also, the vessel is defined by two layers of metal designated as 80a and 80b, respectively. Suitable ribs 83 and 85 are defined on the bottom of the vessel by the process of expanding the metal fully described above and disclosed and claimed in copending Jepson application Serial No. 622,949. The rib 83 defines a passageway which is a continuous passageway in effect defining an outer loop 83a and a second inner loop 83b, in many respects very similar to the two separate loops 28a and 28b described above. The loop 83 has the ends thereof terminating in a chamber 86 (FIGS. 9 and 10) quite similar to the chamber 36 described above. The chamber 86 is actually defined between the two layers 80a and 80b of the vessel which are not molecularly bonded, and the layer 80b is deformed so as to provide an oval sealing flange 88 surrounding an oval opening cut out of the sheet 80b. The flange 88, which is in a plane parallel with the bottom of the vessel, provides an oval sealing surface and also a suitable clamping flange to be described hereinafter. The rib 85 defines a stub passageway similar to the passageway 33 except that in this case the passageway instead of being disposed along a straight line is disposed in a sort of nested relationship with the rib 83b and closely adjacent thereto so that the passageway defined within the rib 85, which is for the temperature sensitive element, is closely adjacent the heating element, and in this way one may eliminate the separate heating element 72 described above.

In accordance with the present invention, a closure member 90 for the oval opening to the chamber 86 is provided, which closure member 90 may be very similar to the closure member 37 described heretofore, including the tubular extension 90a for receiving the tubular member 44 and providing a passageway interconnecting the chamber 86 with a suitable handle chamber.

To secure the closure member 90, which also serves as a handle support, to the cooking vessel 80, there is provided in accordance with the present invention a clamping plate 91 of oval configuration having an exterior dimension slightly larger than the oval opening leading to the chamber 86. Due to the oval configuration, this clamping plate 91 may still be inserted through the smaller opening leading to the chamber 86. Preferably, the clamping plate is provided with a peripheral flange 91a for engaging with the inside of the lateral flange 88, as is clearly shown in FIGS. 9 and 10 of the drawings. In order to hold the clamping plate 91 in position during the assembly operation, a suitable spring clip 93 may be pivotally mounted as by a large hollow rivet 94 to the clamping plate 91. This spring clip 93 may be disposed so that it extends along the major axis of the oval closure plate 91 when the latter is inserted into the recess 86, and then may be turned so as to extend along the minor axis of the closure plate 91 as shown in FIGS. 8 and 10 of the drawings to clamp the closure plate 91 in position with respect to the flange 88. It should be understood that the clip 93 is merely an assembly expedient. Suitable fastening means 95, extending through the closure plate 90, then engage tapped openings in the oval clamping plate 91 to clamp the oval flange 88 between the closure 90 and the clamping plate 91. Preferably, a suitable gasket 97, similar to the gasket 39, will be employed to provide the desired seal. It will be appreciated that electrical connections similar to those described in connection with the preceding embodiment and the tube 51 may extend through the hollow rivet 94 to enter the chamber 86. It will be understood that there has been provided a very simple arrangement yor securing a combined handle support and closure plate to the thin walls defining a vessel chamber in a foolproof and yet very practical manner.

In the embodiments described thus far the temperature sensing means is intended to be constantly associated with the cooking vessel. In the copending Jepson and Wickenberg application referred to above there is disclosed a cooking vessel in which the temperature sensing element and control means is readily separable from the vessel for cleaning purposes, and is generally only associated with the vessel during a cooking operation. The present invention is also applicable to cooking vessels of that type, and in FIGS. 11, 12, 13, 14 and 15 of the drawings there is disclosed another embodiment of the present invention as applied to cooking vessels of that type. Referring now to these figures of the drawings, there is illustrated a cooking vessel generally designated at 100, which is illustrated as comprising a rectangular-shaped vessel portion 101, preferably including legs similar to the legs 26 described above, which have been omitted for the sake of simplifying the disclosure. As is best shown in FIGS. 13, 14 and 15, the vessel portion 101 comprises an inner layer 101a and an outer layer 101b, which are molecularly bonded together over the entire area thereof except for portions defining on the underside of the vessel ribs 103 and 104, respectively. The rib 103 defines a somewhat C-shaped loop defining a passageway 105 therein, while the rib 104 defines a short stub passageway 106 therein. These ribs or passageways, as best shown in FIG. 11 of the drawings, terminate at one edge of the vessel and are defined in the same manner as the tubular passageways of the previous embodiments, namely, by employing a weld preventing material of the desired pattern which precludes bonding of the engaging surfaces of the two sheets of material 101a and 101b defining the vessel portion 101 where the pattern is provided. In accordance with the present invention a terminal support member 108 is suitably welded to the vessel portion 101 and to the ends of the ribs 103 and 104 which define the tubular passageways 105 and 106, respectively, therein. The terminal supporting element 108 is provided with three spaced openings aligned with the ends of the passageways 105 and 106, the passageway 106 being disposed between the two ends of the passageway 105. The center opening 109b aligned with the passageway 106 is visable in FIGS. 12 and 13 of the drawings, and the opening 109a aligned with one end of the passageway 105 is visible in FIG. 14 of the drawings. The welding operation which unites the terminal support 108 with the vessel portion 101 and with the two ends of the passageway 105 and one end of the passageway 106 is such as to provide a seal excluding moisture from the passageways 105 and 106 except through the openings in the terminal support 108. A heating element 110 is then threaded through the passageway 105 with the ends of the heating element extending out of the openings in the terminal support 108. By a suitable forming and swaging operation the vessel 101 is then formed to the desired shape, and the rib 103 is deformed not only into intimate heat exchange relationship with the heating element 110 but into securing relationship therewith to properly secure and position the same within the passageway 105.

In order to seal the openings in the terminal support 108 leading to the passageway 105 against the entrance of moisture, there preferably is provided a terminal assembly which may be substantially identical with that disclosed and claimed in the above-mentioned Jepson and Wickenberg copending application. As best shown in FIG. 14 of the drawings, the heating element 110 terminates in a rigid terminal member 112, a substantial portion of which extends beyond the terminal supporting member 108. Preferably, a suitable ceramic positioning and insulating member 113 surrounds the terminal 112 at each end of the heating element 110 within the opening defined in the terminal supporting member 108. A suitable sealing gasket 114, preferably formed of silicone or the like, is then compressed between a sleeve type terminal member 115 and the terminal supporting member 108. This sleeve type terminal member 115 is preferably clamped to the terminal 112 by a clamping member 116 which maintains the sealing gasket 114 under compression in exactly the same manner as is disclosed and claimed in the copending Jepson and Wickenberg application. To define a suitable terminal receptacle, a closure member 118 is preferably provided around the terminals 115, as clearly shown in FIGS. 11, 12 and 14 of the drawings, thus providing the conventional receptacle for receiving a female type plug commonly used with cooking vessels.

Preferably and as illustrated in the above-mentioned copending Jepson and Wickenberge application, there is provided a combined temperature sensing and electrical connector designated at 120, which comprises electrical terminals 121 for receiving the terminals 115. The terminals 121 are connected to a suitable source of power by a power cord 122. The unit 120 includes a control knob 123 for selectively adjusting temperature control means including a temperature sensing element disposed within a sort of probe member 124 projecting from the unit 120 between the terminals 121. This temperature sensing probe 124 is of a size as to be snugly received within the passageway 106, as clearly shown in FIGS. 13 and 15 of the drawings.

The arrangement disclosed in FIGS. 11 to 15 of the drawings will readily be understood by those skilled in the art and clearly demonstrates that the present invention is applicable to cooking vessels of either the type shown in FIG. 2 or in FIG. 11 of the drawings.

In FIG. 16 of the drawings there is illustrated a die member, generally designated by the reference numeral 130, which may be used in connection with the swaging operation for causing the walls defining the passageway for the heating element of the cooking vessels to be moved into intimate heat exchange relationship with the heating element. As illustrated, this die member 130 comprises a suitable support 131 for a rubber or otherwise resilient die member 132. This die member 130 is applied to the bottom of the vessel such as 101 shown in FIG. 11 of the drawings with sufficient force to deform the rib 103 into intimate heat exchange relationship with the heating element 110 disposed therein. The outline of this rib 103 is shown in dotted lines in FIG. 16 indicating the deformation of the rubber or resilient die member 132 during such deforming step. By using such a rubber die member the swaging operation can be performed with the same die member for different patterns of distribution of the heating element, whereas if a metal die member were employed a different member would be necessary for each distribution pattern.

In FIG. 2 of the drawings a heater is provided for the passageway 33 which is separate from the main heating element 34. However, the main heating element may serve both functions as was shown in connection with FIG. 8. A modification of this is shown in FIGS. 17 and 18 of the drawings.

In FIG. 17 there is illustrated a fragmentary view of a cooking vessel embodying a control arrangement very similar to that shown in FIG. 2 of the drawings. The passageway 33 contains a bulb type element 135 connected by a suitable capillary tube 136 with a suitable diaphragm, not shown, which may be substantially identical with the diaphragm described above. The arrangement in FIG. 17 differs from that shown in FIG. 2 in that the heating element 138 for heating the bottom of the vessel portion 21 itself extends into the stub passageway 33. The feature of the present invention illustrated by FIG. 17 is that the heating element 138 is indicated as comprising a spirally wound resistance wire, the turns of which are spaced differently depending upon the magnitude of heating effect to be produced. Thus, the turns within the passageways 28a and 28b are relatively closely spaced to give the desired uniform heating of the vessel, but within the passageway 33 the turns are effectively stretched out as clearly indicated in FIGS. 17 and 18 of the drawings to give the desired anticipatory heating of the temperature sensitive element 135. This is best shown in the developed view of FIG. 18, where the heating element 138 is shown comprising the closely wound turns 138a where disposed within the passageways defined by the ribs 28a and 28b, and the widely spaced turns designated as 138b where disposed within the passageway 33.

In FIG. 19 of the drawings there is illustrated a modification of the arrangement shown in FIG. 17 embodying the same principle. A fragment of a cooking vessel 140 is illustrated in which the ribs 28a and 28b are identical with the corresponding ribs in FIG. 2 of the drawings and which terminate in the chamber 36. In this case, however, the rib 32 defining the stub passageway 33 is eliminated and, instead, a so-called doughnut-shaped temperature sensitive element 141 is employed disposed within the chamber 36'. This doughnut-shaped element 141 is supported by a lug 143 in chamber 36' and is connected by a suitable capillary tube 142 with the necessary diaphragm for converting expansion of the fluid contained therein to mechanical motion. In accordance with the present invention the heating element 138 for heating the frying pan has a portion thereof looped around the lug 143 and disposed in intimate heat exchange relationship with the doughnut-shaped element 141, as clearly shown in FIG. 19 of the drawings. As shown in FIGS. 17 and 18, the turns defining the heating element 138 are relatively closely spiralled within the passageways defined by the ribs 28a and 28b, but are spread out in the portion thereof in intimate heat exchange relationship with the temperature sensitive element 141, thus giving a somewhat heat anticipating effect.

It will be apparent from FIGS. 8, 17, 18 and 19 that a single heating element may be employed which not only provides the desired heating of the cooking vessel, but which also provides the desired heating of the temperature sensitive element in a simple manner.

While there have been illustrated and described several embodiments of the invention, it will be understood, of course, that the invention is not limited thereto, since many modifications may be made, and it is, therefore, contemplated by the appended claims to cover any such modifications as fall within the true spirit and scope of the invention.

What is claimed as new and desired to be secured by Letters Patent of the United States is:

1. A heating device comprising a vessel having a laminated bottom and integrally connected laminated side walls, said bottom including a first plane metal layer defining a plane heating surface and a second metal layer generally coextensive with said first layer intimately molecularly bonded to said first layer over the major portion of the areas of said layers, a portion of said layers being separated to define a chamber between said layers with an opening in said second layer affording access to said chamber, means defining a first looplike passageway between said layers with the ends of said passageway connected to said chamber, an electrical heating element disposed in said passageway with the ends thereof extending into said chamber, a temperature sensing element disposed in intimate heat exchange relationship with said heating surface so as to be responsive to the temperature thereof, and electrical means operable simultaneously with said heating element in direct heat exchange relationship with said temperature sensing element for additionally heating said temperature sensing element.

2. The heating device of claim 1 wherein said electrical means comprises an element separate from said heating element.

3. The heating device of claim 1 wherein said electrical means comprises a portion of said heating element.

4. A cooking vessel comprising a laminated member including a first layer defining a cooking surface and a second layer bonded to said first layer, a portion of said layers being separated to define a chamber between said layers with an opening in said second layer affording access to said chamber, means defining a first looplike passageway between said layers with the ends of said passageway connected to said chamber, an electrical heating element disposed in said passageway with the ends thereof extending into said chamber, said heating element comprising a spirally wound resistance element the turns of which are closely spaced, a second passageway defined between said layers and having one end connected to said chamber, a temperature sensing element disposed in said second passageway, said temperature sensing element being responsive to the temperature of said cooking surface, and electrical means comprising a portion of said heating element with the turns thereof extended to produce less heating effect disposed in direct heat exchange relationship with said temperature sensing element for additionally heating said temperature sensing element.

5. In a cooking vessel, the combination of a laminated member including a first layer defining a cooking surface and a second layer intimately bonded to said first layer throughout the major area of said layers, a portion of said layers being separated to define a chamber between said layers with an opening in said second layer affording access to said chamber, means defining a first looplike passageway between said layers with the ends of said passageway connected to said chamber, an electrical heating element disposed in said passageway with the ends thereof extending into said chamber, a second looplike passageway defined between said layers and having one end connected to said chamber, said second passageway being of substantial length and disposed substantially equidistant throughout the length thereof from said first looplike passageway, and a temperature sensing element disposed in said second passageway, said temperature sensing element being responsive to the temperature of said cooking surface.

6. A cooking vessel comprising a laminated member including a first layer defining a cooking surface and a second layer bonded to said first layer, a portion of said layers being separated to define a chamber between said layers with an opening in said second layer affording access to said chamber, means defining a first looplike passageway between said layers with the ends of said passageway connected to said chamber, an electrical heating element disposed in said passageway with the ends thereof extending into said chamber, a temperature sensing element disposed in intimate heat exchange relationship with said cooking surface so as to be responsive to the temperature thereof, a combined cover and handle support for sealing said opening, a handle secured to said cover and handle support, and selectively adjustable means on said handle for controlling the effectiveness of said temperature sensing element.

7. The heating device of claim 1 wherein said temperature sensing element is disposed in a passageway defined between said layers.

8. The heating device of claim 7 wherein said temperature sensing element is readily removable from said passageway.

9. The heating device of claim 7 wherein said device is a cooking vessel and said temperature sensing element includes an expansible fluid.

10. A laminated cooking vessel comprising a first layer defining a heating surface and a second layer coextensive with said first layer and intimately bonded to said first layer over substantially the entire area thereof, a portion of said second layer being separated from and spaced from said first layer to define a chamber between said layers, a portion of said second layer defining the periphery of an access opening for said chamber, a first closure member for said access opening larger than said opening and positioned within said chamber, a second closure member for said opening larger than said opening and positioned outside said chamber, and means for clamping the portion of said second layer defining the periphery of said access opening between said closure members to seal said chamber against the entrance of moisture.

11. In a cooking vessel, a multilayer metal member including a first layer defining a heating surface and a second layer intimately bonded to said first layer, a portion of said second layer being separated from and spaced from said first layer to define a chamber between said layers, a portion of said second layer defining the periphery of an access opening for said chamber, a first closure member for said access opening larger than said opening and positioned within said chamber, a second closure member for said opening larger than said opening and positioned outside said chamber, means for clamping the portion of said second layer defining the periphery of said access opening between said closure members to seal said chamber against the entrance of moisture, and a handle for said vessel secured to said second closure member.

12. The cooking vessel of claim 10 wherein means are provided for securing said first closure member to said portion of said second layer.

13. In a cooking vessel, a laminated metal member including a first layer defining a heating surface and a second layer bonded to said first layer, a portion of said second layer being separated from and spaced from said first layer to define a chamber between said layers, a portion of said second layer defining the periphery of an oval access opening for said chamber, a first oval closure member for said oval access opening larger than said opening and positioned within said chamber, said first closure member being insertible into said opening, a second closure member for said opening larger than said opening and positioned outside said chamber, and means for clamping the portion of said second layer defining the periphery of said access opening between said closure members to seal said chamber against the entrance of moisture.

14. The cooking vessel of claim 13 wherein means are provided for temporarily holding said first closure member in position relative to said opening, and wherein said means for clamping comprises fastening means extending through said second closure member into said first closure member.

15. The heating device of claim 1 wherein said electrical means comprises a resistance heater supplied with power at all times proportional to the power supplied to said electrical heating element.

16. A heating device comprising a heating surface, a heating element in thermal conductive relationship with said heating surface, means for controlling the energization of said heating element comprising a doughnut shaped temperature sensing element, and means for securing said temperature sensing element in thermal conductive relationship with said surface, said heating element including a loop portion disposed in thermal conductive relationship with said temperature sensing element.

17. The heating device of claim 16 wherein said heating element includes a spirally wound resistance having closely spaced turns, said turns being less closely spaced in said loop portion.

18. The heating device of claim 16 wherein said means for securing said temperature sensing element also secures said loop portion in thermal conductive relationship with said temperature sensing element.

References Cited in the file of this patent

UNITED STATES PATENTS

| | | |
|---|---|---|
| 1,565,499 | Reid | Dec. 15, 1925 |
| 1,689,809 | Vaughan | Oct. 30, 1928 |
| 1,994,909 | Ehrgott | Mar. 19, 1935 |
| 2,042,203 | Backer | May 26, 1936 |
| 2,303,012 | Weber et al. | Nov. 24, 1942 |
| 2,421,953 | MacKendrick | June 10, 1947 |
| 2,443,806 | Shafter | June 22, 1948 |
| 2,597,695 | Braski et al. | May 20, 1952 |
| 2,651,707 | Jepson | Sept. 8, 1953 |
| 2,677,172 | Oakley | May 4, 1954 |
| 2,725,453 | Haller | Nov. 29, 1955 |
| 2,728,830 | Cox | Dec. 27, 1955 |
| 2,735,162 | Huck | Feb. 21, 1956 |
| 2,744,995 | Jepson | May 8, 1956 |
| 2,777,300 | Palmer | Jan. 15, 1957 |
| 2,840,669 | Russell | June 24, 1958 |
| 2,847,553 | Smith | Aug. 12, 1958 |
| 2,854,548 | Cassidy | Sept. 30, 1958 |
| 2,880,301 | Naxon | Mar. 31, 1959 |
| 2,927,189 | Purpura | Mar. 1, 1960 |
| 2,931,884 | Jepson et al. | Apr. 5, 1960 |

FOREIGN PATENTS

| | | |
|---|---|---|
| 204,091 | Australia | Sept. 20, 1956 |